Jan. 1, 1963    J. A. CLARK    3,070,912
SLIDE PROJECTOR
Original Filed Dec. 14, 1959
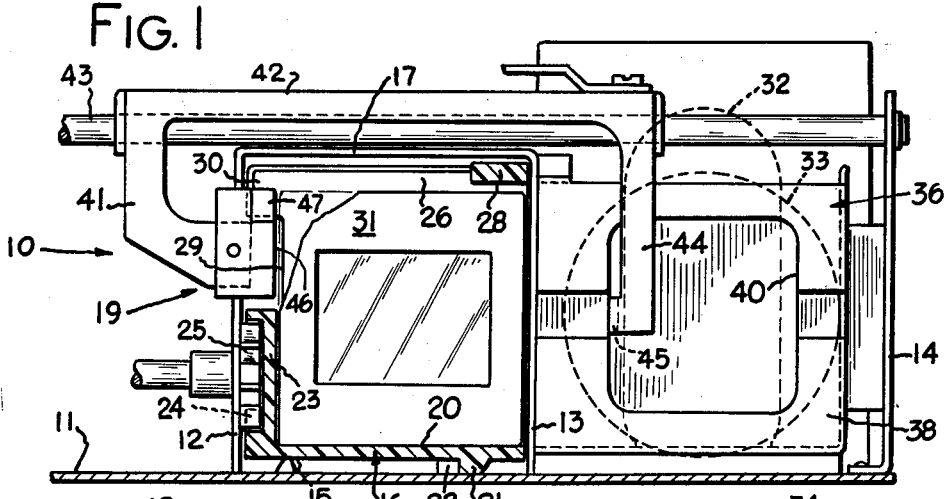
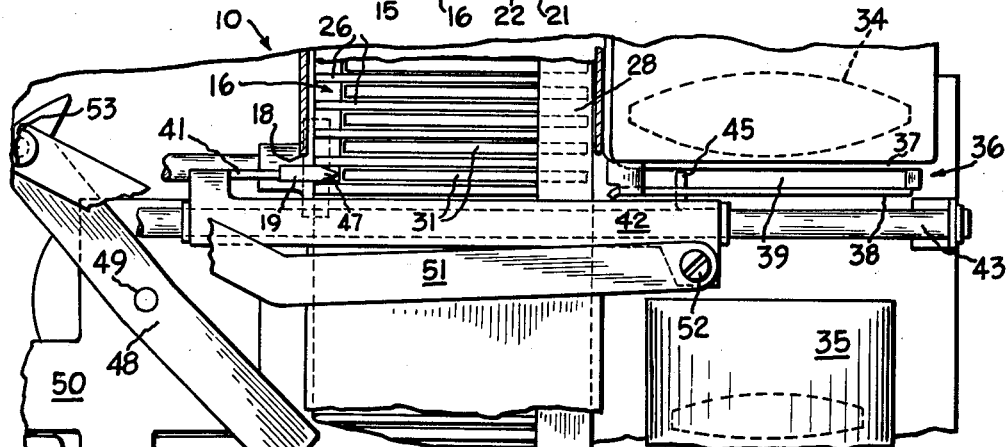
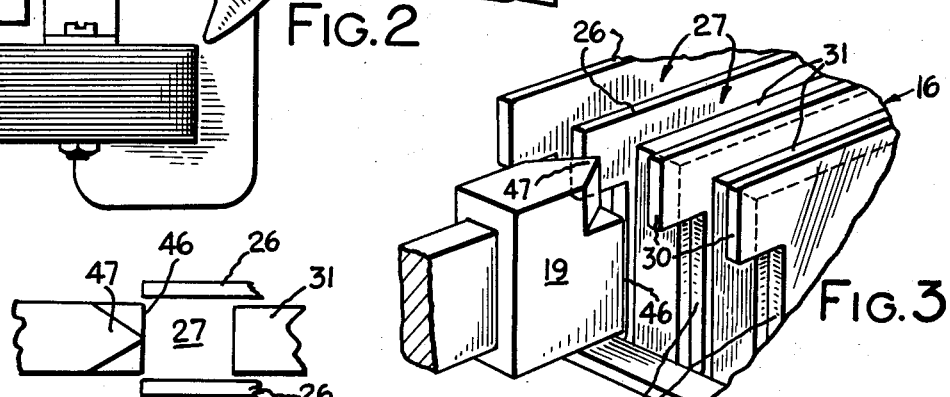
INVENTOR.
JAMES A. CLARK
BY
Frank C. Parker
ATTORNEY

United States Patent Office 3,070,912
Patented Jan. 1, 1963

3,070,912
SLIDE PROJECTOR
James A. Clark, Rochester, N.Y., assignor to Bausch & Lomb Incorporated, Rochester, N.Y., a corporation of New York
Continuation of application Ser. No. 859,343, Dec. 14, 1959. This application June 29, 1961, Ser. No. 124,285
5 Claims. (Cl. 40—79)

The present invention relates in general to slide projectors and is more particularly concerned with an improved slide pusher mechanism for such projectors.

This is a continuation of my copending application Serial No. 859,343; filed December 14, 1959, now abandoned.

Slide projectors of the general type to which the present invention is particularly applicable include a longitudinally movable slide tray adapted to be moved in a stepped fashion in order to successively advance the tray and thereby bring the slide receiving slots therein opposite to a slide receiving receptacle. When the tray is thus advanced or stepped, a slide pusher is moved into a slot in the tray in order to move a slide disposed in the slot into the slide receptacle for projection of an image of such slide onto a viewing screen.

It has been found, in projectors utilizing a slide tray of the aforementioned type, that there is sometimes slight misalignment between the slide pusher and the slide receiving slots in the slide tray. It is, therefore, a principal object of the present invention to provide means for assuring alignment of the slide pusher with the slide tray slots in each position of the slide tray.

Tapered dividers have been incorporated in conventional slide trays. The use of tapered dividers facilitates molding techniques, improves the aesthetic quality since the dividers appear thinner, and facilitate loading the tray with slides. The tapered dividers also tend to compensate for slight misalignment of the slide tray and the pusher. However since the dividers are normally substantially thinner than the slots, such compensation is often inadequate. Advantageously a slide projector according to the invention incorporates an improved means for aligning the slide pusher with the slide tray slots.

A more particular object of the present invention is to provide a slide tray including a plurality of spaced dividers each including a projecting portion and a relatively recessed portion, with the slide pusher including a slide engaging portion such as a substantially flat region disposed opposite the recessed portion for abutting the edge of the slide in the adjacent slot and a chamfered region engageable with the edges of said tray projecting portions for facilitating alignment of the slide pusher with the slots in the tray.

An advantage provided by the present invention stems from the fact that it is easily possible to form the slide receiving trays of a molded plastic material, thereby enabling the formation of the trays in a cheap and efficient manner.

Briefly, the present invention contemplates the combination of a generally rectangular slide tray comprising a plurality of spaced relatively narrow dividers forming slots therebetween of substantially greater width than the thickness of the dividers, and a reciprocable slide pusher including a slide engaging portion and a chamfered portion. The slots are adapted to receive a plurality of slides, being partially closed along one side and substantially open along the opposite side of the tray. The dividers include extensions projecting outwardly beyond the inside of the partial closure on the one side of the tray. The chamfered portion of the pusher is cooperable with the divider extensions for facilitating alignment of the pusher with the respective slots.

The foregoing objects and advantages of the present invention will become more apparent from the following detailed description thereof when read in conjunction with the accompanying drawings, wherein:

FIG. 1 is a front elevational view showing a slide projector fragmentarily and illustrating the principal features of the present invention;

FIG. 2 is a fragmentary top plan view of that portion of the slide projector shown in FIG. 1;

FIG. 3 is a fragmentary perspective view illustrating the cooperable parts of the slide tray and slide pusher; and FIG. 4 is a detailed fragmentary view better illustrating the configuration of the slide pusher with relation to the slide tray.

With reference to the drawings, wherein like reference numerals have been used to identify identical parts in the different views, a slide projector is shown fragmentarily and is illustrated by reference numeral 10. The slide projector 10 comprises a base 11 and a plurality of upright portions 12, 13 and 14. The base 11 is also provided with a rib 15 disposed adjacent the upstanding member 12 for supporting a slide tray 16 in horizontal alignment with respect to the slide projector.

The upstanding portions 12 and 13, together with a top member 17, form a chute for receiving the slide tray 16, it being understood that the upstanding portion 12 is open, as indicated at 18 for enabling a slide pusher 19 to pass therethrough and into the slide tray 16.

The slide tray 16 comprises a base 20 having a longitudinal rib 21 adapted to ride on top of base 11 and with a plurality of uniformly spaced rack teeth 22 disposed thereon. The tray 16 is formed with a slide 23 having driving rack teeth 24 formed thereon which cooperate with a driving pinion 25. The slide tray 16 comprises a plurality of relatively narrow spaced dividers 26 which form a plurality of slide receiving slots 27 therebetween. In order to rigidify the dividers 26 a top member 28, which extends along the length of the slide tray, is integrally secured to each of the dividers 26. The slide tray is therefore open completely along the right side (as viewed in FIG. 1) and is open from the top of a half-wall 23 on the left side, and across the top of the tray as far as the top member 28.

Each of the dividers 26 comprises a recessed portion 29 and a projecting portion 30. A plurality of slides 31 are respectively adapted to be received within the slots 27.

The slide projector 10 also comprises a projection lamp 32, a reflector 33, a condenser lens assembly 34 and a projection lens assembly 35. Disposed between the condenser lens assembly 34 and the projection lens assembly 35 is a slide receptacle 36 comprising a pair of spaced members 37 and 38 which define a slot 39 for receiving a slide 31. The members 37 and 38 are each provided with suitable openings such as are designated by reference numeral 40 and when a slide 31 is disposed within the slide receptacle 36 it is in optical alignment with the projector lamp 32, the condenser lens 34 and the projection lens assembly 35 so that an image of the object appearing on the slide 31 may be projected upon a viewing screen (not shown).

In order to move the slides 31 successively from the slide receiving slots in the tray 16 into the slide receptacle 36, the slide pusher 19 is provided. The slide pusher 19 is formed at the lower end of an arm 41 secured to a slide pusher mechanism 42 which is reciprocable on a fixed rod or shaft 43. The slide pusher mechanism also includes a second arm 44 and a foot 45 for returning each of the slides 31 from the receptacle 36 to the aligned slide receiving slot 27 in the tray 16. The slide pusher foot 19 comprises a slide engaging portion such as a flat region 46 for engaging the edges of the slide 31 and also includes a portion 47 which is chamfered on the opposite sides in order to provide a pointed portion cooperable with a projection 30 to assure alignment of the pusher foot 19 with the slots 27.

The slide pusher member 42 is reciprocated by means of a crank mechanism 48 rotatably mounted at 49 and driven by a motor 50. The crank mechanism 48 is connected to the slide pusher mechanism 42 by a link 51 pivotally connected at its opposite ends to the slide pusher mechanism 42 and to the crank 48 by means of pivot bolts 52 and 53 respectively.

In the operation of the slide pusher described hereinbefore, the motor 50 is actuated so as to drive the crank 48 through approximately 180° of revolution from the position of the crank shown in FIG. 2. This causes the pusher foot 19 to move a slide 31 from the slot 27 aligned with the pusher foot into the slide receptacle 36. After a predetermined interval of time, which may be either manually or automatically controlled, the motor 50 drives the crank 48 through a second 180°, thereby causing the crank to return to the position shown in FIG. 2. During this portion of the cycle the slide return pusher foot 45 engages the slide disposed in the slide receptacle 38 and returns the slide back into the appropriate slot 27. Toward the end of the second 180° of rotation of the crank 48, the pinion 25 is rotated in order to advance the slide tray 16 one step, thereby aligning the pusher foot 19 with the next successive slot in the tray 16. When the pusher foot 19 is moved to the right the chamfered portion 47 of the pusher foot 19 cooperates with the projections 30, if necessary, in order to align the tray 16 precisely with the pusher foot 19.

By the present invention a simple and substantially foolproof mechanism is provided for assuring the proper alignment of the slide tray 16 with the pusher foot 19 during each cycle of operation of the projector.

It is contemplated that numerous changes and modifications may be made in the present invention without departing from the spirit or scope thereof.

What is claimed is:

1. In combination, a generally rectangular slide tray comprising a plurality of spaced relatively narrow dividers forming slots therebetween of substantially greater width than the thickness of said dividers and for respectively receiving a plurality of slides, said slots being partially closed along one side of the tray and sufficiently open along the opposite side of the tray to facilitate passage of the slides therethrough, said dividers including extensions projecting outwardly beyond the inside of the partial closure along said one side of the tray, a reciprocable slide pusher movable into the slot in substantial alignment therewith for engaging a slide disposed in the slot and pushing the same out of the opposite side of the tray, and said slide pusher including a slide engaging portion and a chamfered portion cooperable with said divider extensions for facilitating alignment of the pusher with the respective slots.

2. In combination, a generally rectangular slide tray comprising a plurality of spaced relatively narrow dividers forming slots therebetween of substantially greater width than the thickness of said dividers and for respectively receiving a plurality of slides, a narrow wall extending along and partially closing one side of the tray, the opposite side of said tray being substantially open to facilitate passage of the slides therethrough, said dividers including extensions projecting outwardly beyond the inside of said narrow wall, a reciprocable slide pusher movable into the slot in substantial alignment therewith for engaging a slide disposed in the slot and pushing the same out of the opposite side of the tray, said slide pusher including a slide engaging portion and a chamfered portion cooperable with said divider extension for facilitating alignment of the pusher with the respective slots.

3. In a slide projector of the type utilizing a generally rectangular slide tray including a plurality of relatively narrow spaced dividers for respectively receiving a plurality of slides therebetween, a reciprocable relatively thick slide pusher movable into a slot defined by the relatively narrow dividers in substantial alignment therewith for engaging a slide disposed in the slot and pushing the same out of the opposite side of the tray, the improvement comprising a relatively thick slide pusher having a thickness substantially greater than the thickness of the relatively narrow dividers, and said pusher including a slide engaging portion and a chamfered portion for facilitating the alignment of the pusher with the respective slots of the slide tray and for overcoming misalignment between the slide pusher and the slot.

4. In combination, a generally rectangular longitudinally movable slide tray comprising a plurality of spaced dividers forming slots therebetween for respectively receiving a plurality of slides, a slide receptacle disposed adjacent to and on one side of said slide tray, a reciprocable slide pusher engageable with an edge of a slide disposed within the slot in substantial alignment with the pusher for pushing the slide out of the slot and into the receptacle, each of said dividers including a projecting portion and a relatively recessed portion disposed on the side of the tray opposite the receptacle and said slide pusher including a slide engaging region disposed opposite said recessed portion and adapted to abut the edge of the slide in the adjacent slot and a region chamfered on opposite sides of the pusher cooperable with the edges of said projecting portions for facilitating alignment of the pusher with said slot.

5. A cooperable slide tray and slide pusher mechanism for use with a transparent slide projector of the type adapted to receive a longitudinally movable slide tray and advance the same in a stepped manner in order to align successive slides disposed in the tray in alignment with a slide receptor, said slide tray comprising a plurality of spaced dividers forming slots therebetween for respectively receiving a plurality of slides, each of said dividers including a projecting portion and a relatively recessed portion disposed on the side of the tray opposite the slide receptor, said slide pusher being chamfered on opposite sides thereof for cooperation with adjacent ones of said projecting portions of said dividers for facilitating alignment of the pusher with said respective slots, and said pusher including a substantially flat region cooperable with the edge of a slide disposed in an aligned slot for pushing such slide out of the slot and into the receptor.

References Cited in the file of this patent

UNITED STATES PATENTS 2,427,164     Stechbart _____ Sept. 9, 1947

UNITED STATES PATENT OFFICE

CERTIFICATE OF CORRECTION

Patent No. 3,070,912                            January 1, 1963

James A. Clark

It is hereby certified that error appears in the above numbered patent requiring correction and that the said Letters Patent should read as corrected below.

Column 2, line 32, for "slide" read -- side --.

Signed and sealed this 25th day of June 1963.

(SEAL)
Attest:

ERNEST W. SWIDER
Attesting Officer

DAVID L. LADD
Commissioner of Patents